Aug. 25, 1931.  C. C. FARMER  1,820,013
FLUID PRESSURE BRAKE
Filed March 12, 1929
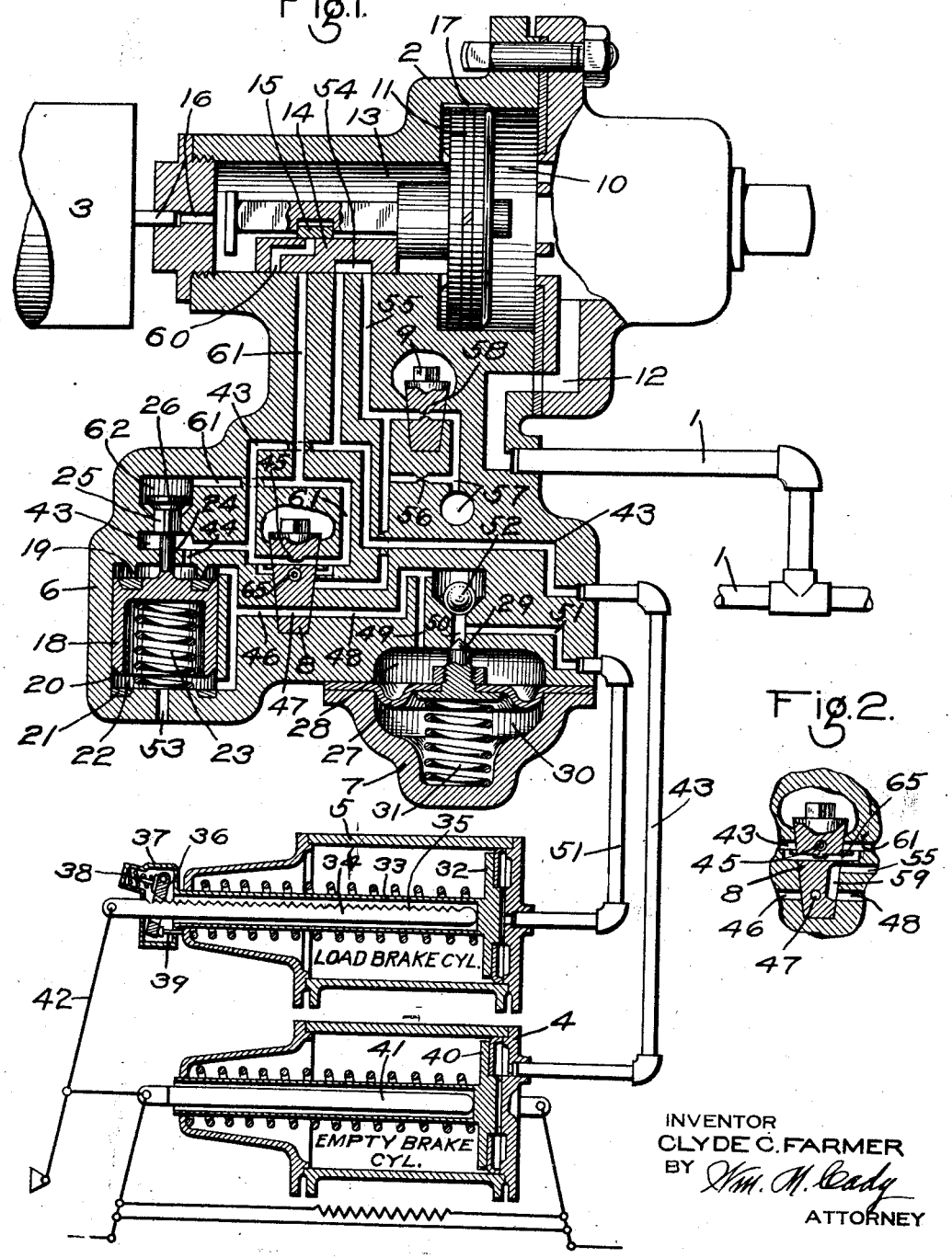
INVENTOR
CLYDE C. FARMER
BY Wm. M. Cady
ATTORNEY Patented Aug. 25, 1931

1,820,013

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed March 12, 1929. Serial No. 346,295.

This invention relates to fluid pressure brakes and more particularly to fluid pressure brakes of the empty and load type.

The principal object of my invention is to provide a fluid pressure brake equipment, of the empty and load type, having means for preventing the pressure of fluid in the empty brake cylinder from reducing into the load brake cylinder when the empty brake cylinder pressure is built up to a predetermined degree and the load brake cylinder is cut in, so that the slack in the brake rigging will be maintained taken up by the empty brake cylinder.

Other objects and advantages will appear in the following more detailed description of the invention.

In the accompanying drawings; Figure 1 is a diagrammatic view, mainly in section, of an empty and load brake equipment embodying my invention; and Fig. 2 is a sectional view of the empty and load changeover valve in position to cut out the load brake cylinder.

As shown in the accompanying drawings, the brake equipment may comprise a brake pipe 1, a triple valve device 2, an auxiliary reservoir 3, an empty brake cylinder 4, a load brake cylinder 5, a load brake cylinder cut-in valve device 6, a load brake cylinder control valve device 7, an empty and load change-over valve 8 and a release control valve 9.

The triple valve device may comprise a casing having the usual piston chamber 10 containing a piston 11, and communicating with the brake pipe 1 through a passage 12, and also having a valve chamber 13 containing a main slide valve 14 and an auxiliary slide valve 15 adapted to be operated by the piston 11, said valve chamber communicating with the auxiliary reservoir 3 through a pipe and passage 16. The piston chamber 10 is adapted to communicate with the valve chamber 13 through the usual feed groove 17.

The load brake cylinder cut-in valve device 6 may comprise a casing containing a valve piston 18 adapted, at one side, to seal against a seat ring 19 and having a valve 20 adapted to seat on an annular gasket 21 mounted in the casing. Contained in a valve chamber 22, at one side of the valve piston, and interposed between said valve piston and the casing is a spring 23, the pressure of said spring being adapted to normally maintain the valve piston sealed against the seat ring 19.

Extending outwardly from the inner seated area of the valve piston 18 there is a centrally arranged projection 24, which is adapted to engage with the end of a fluted stem 25 of a quick inshot valve 26, the operation of said valve being controlled by the operation of said valve piston.

The load brake cylinder control valve device may comprise a casing in which is mounted a flexible diaphragm 27. Contained in a chamber 28 at one side of the diaphragm and attached to the diaphragm is a valve 29. Contained in a chamber 30 at the other side of the diaphragm is a spring 31 which engages the diaphragm.

The load brake cylinder 5 may comprise a casing containing a piston 32 having a hollow stem 33 in which there is mounted a push rod 34 having a series of notches 35 with which a latch 36 is adapted to engage. This latch is operatively mounted in a box or casing 37 secured to the outer end of the hollow piston stem 33 and is subject to the pressure of a spring pressed plunger 38 for assisting the latch to engage the push rod within the notches. The latch 36, when the load brake cylinder is in release position, is held out of locking engagement with the push rod by the engagement of a pin 39 with the casing of the brake cylinder, which pin is slidably mounted in the latch casing 37.

The empty brake cylinder 4 may comprise a casing containing a piston 40 in which there is mounted a push rod 41.

The outer ends of the push rods 34 and 41 are operatively connected to a brake lever 42 which is connected to the brake rigging in the usual manner.

In applying or releasing the brakes when the empty brake cylinder 4 is employed, the push rod 34 of the load brake cylinder moves in and out relative to the hollow piston stem 33. When the empty brake cylinder 4 and load brake cylinder 5 are employed to apply the brakes, the empty brake cylinder operates to take up the slack in the brake rigging and as it operates, the push rod 34 is moved outwardly relative to the piston stem 33 by the lever 42. When a predetermined pressure has been obtained in the empty brake cylinder, the load brake cylinder 5 is brought into operation, and the piston 32, stem 33, push rod 34, and latch casing 37 are moved outwardly. As the latch box 37 is thus moved, the pressure on the pin 39 is relieved, so that the spring pressed plunger 38 will force the latch 36 into locking engagement with the push rod 34 and a continued outward movement of the piston will increase the force on the brake levers and consequently on the brake shoes, (not shown).

In operation, fluid under pressure supplied to the brake pipe 1 flows to the piston chamber 10 of the triple valve device 2 through the passage 12, causing the piston 11 to be moved to its innermost or release position as shown in Fig. 1 of the drawing, carrying with it the slide valves 14 and 15. In this position of the piston, fluid under pressure is supplied from the piston chamber 10 to the auxiliary reservoir 3 through the feed groove 17 around the piston, valve chamber 13 and passage and pipe 16.

In order to effect a service application of the brakes when the change-over valve 8 is in position to cut the load cylinder 5 in operation, a reduction in brake pipe pressure is effected in the usual way, and since the brake pipe is connected to the piston chamber 10 through passage 12, the pressure in said chamber will also be reduced. Upon the reduction of the pressure of fluid in the chamber 10, the auxiliary reservoir pressure in the valve chamber 13 acts upon the piston 11 to move it to its outer or service position, carrying with it the slide valves 14 and 15.

With the slide valves 14 and 15 in service positions, fluid under pressure from the auxiliary reservoir 3 is supplied to the empty brake cylinder 4 through the valve chamber 13, a port 60 in the main slide valve 14, a passage 61, a chamber 62 containing the inshot valve 26, past the unseated valve 26 and its fluted stem 25 and through a passage and pipe 43.

With the quick inshot valve 26 unseated, the flow of fluid under pressure to the empty brake cylinder 4 will be unrestricted and the build up in empty brake cylinder pressure will be quick, so that the slack in the brake rigging will be quickly taken up before the load brake cylinder 5 is caused to operate.

When the pressure of fluid in the empty brake cylinder is built up to a predetermined degree, say for instance 10 pounds, fluid under pressure flowing from the passage 43 to the inner seated area of the valve piston 18 through a passage 44 causes the valve piston to move downwardly against the pressure of the spring 23 out of sealing engagement with the seat ring 19 and causes the valve 20 to seal against the gasket 21. When the valve piston is thus moved downwardly out of supporting engagement with the quick inshot valve 26, said valve will, due to the influence of gravity, seat and thus close off the unrestricted flow of fluid under pressure to the empty brake cylinder 4.

With the quick inshot valve 26 seated, fluid under pressure is supplied to the empty brake cylinder 4, at a restricted rate through passage 61, a restricted passage 45 in the change-over valve 8 and passage and pipe 43.

With the valve piston 18 unseated from its seat ring 19, fluid under pressure from the passage 43, besides flowing to the empty brake cylinder 4, also flows to the diaphragm chamber 28 in the load brake cylinder control valve device 7, through passage 44, past the unseated valve piston 18, through a passage 46, a passage 47 in the change-over valve 8 and passages 48 and 49.

Now when the pressure of fluid in the empty brake cylinder is built up to a degree sufficient to operate the empty brake cylinder to take up the slack in the brake rigging, the fluid in the diaphragm chamber 28 in the control valve device 7, which is at empty brake cylinder pressure, acts upon one side of the diaphragm and causes it to flex downwardly against the pressure of the spring 31, unseating the valve 29 which permits fluid under pressure to flow from the diaphragm chamber 28 to the load brake cylinder 5, past the unseated valve 29, through a passage 50 and a passage and pipe 51.

The pressure valve of the spring 31 of the control valve device 7 is such that the diaphragm 27 will not be permitted to operate the valve 29 from its seat to supply fluid under pressure to the load brake cylinder 5 until the pressure of fluid in the empty brake cylinder 4 is built up to a predetermined value which is sufficient to operate the empty brake cylinder to take up the slack in the brake rigging.

When the valve 29 of the control valve device is unseated and fluid under pressure is supplied to the load brake cylinder 5, the pressure of fluid in the chamber 28 is reduced and the pressure of the spring causes the diaphragm to operate to move the valve 29 toward its seat and as fluid under pressure continues to be supplied to the valve chamber 28, the valve 29 will only close to such an extent as to limit the rate of flow of fluid to the load brake cylinder to substantially the same rate as it is being supplied to the chamber 28. The valve will now remain in this position until the pressure of fluid in the load brake cylinder 5 is substantially equal to the pressure of fluid in the empty brake cylinder 4, when the pressure of fluid in both brake cylinders will be increased, and when the increased pressure acting on one side of the diaphragm 27 is sufficient to overcome the pressure of the spring 31 acting on the other side of the diaphragm, the diaphragm operates to completely open the valve 29.

If for any reason the valve 29 should be fully opened, when the pressure of fluid is built up to its predetermined minimum value in the empty brake cylinder 4 and the flow of fluid to the load brake cylinder 5 should be great enough to cause a sudden reduction in the pressure of fluid in the chamber 28 of the control valve device, the pressure of the spring 31 will operate to seat the valve 29 and thus close communication to the load brake cylinder 5 and will remain seated until the pressure of fluid in the chamber 28 is sufficient to operate the diaphragm 27 to again unseat the valve 29. It will thus be seen that the pressure of fluid in the empty brake cylinder 4 cannot reduce into the load brake cylinder 5. Should the pressure of fluid in the empty brake cylinder be permitted to reduce into the load brake cylinder, the pressure of the spring 23 would cause the valve 20 of the valve piston 18 to unseat, so that fluid under pressure which may have been supplied to the load brake cylinder would be vented to the atmosphere by way of pipe and passage 51, passage 50, past a ball check valve 52 through passage 48, passage 47 in the change-over valve 8, passage 46, chamber 22 in the load cut-in valve device 6 and atmospheric passage 53, and would limit the empty brake cylinder pressure to a pressure determined by the setting at which the valve piston 18 operates to supply fluid under pressure to the diaphragm chamber in the control valve device 7.

To effect a release of the brakes, the brake pipe pressure is increased in the usual manner, which causes the triple valve piston 11 to be shifted to its innermost or release position, carrying with it the slide valves 14 and 15 to their release positions. With the main slide valve 14 in release position, fluid under pressure from the empty brake cylinder 4 flows to the atmosphere through pipe and passage 43, a cavity 54 in the main slide valve 14, a passage 55, a restricted passage 56 and passage 57. Fluid under pressure from the load brake cylinder 5 is vented to the atmosphere by way of pipe and passage 51, passage 50, past the ball check valve 52, passage 48, passage 47 in the change-over valve 8, passage 46 past the valve piston 18 through passage 44 and passage 43 and therethrough to atmosphere as just described. When the pressure of the brake cylinders has been reduced sufficiently to permit the spring 23 to seat the valve piston on the seat ring 19, the load brake cylinder will be vented to atmosphere by way of passage 46, chamber 22 in the valve device 6 and passage 53.

When a quick release of the brakes is desired, the control valve 9 is manually operated, through the medium of any suitable handle or the like (not shown), to the position, as shown in Fig. 1, in which fluid from the passage 55 also flows to the passage 57 through a restricted passage 58.

When operating empty cars, it is desirable, for well known reasons, to render the load brake cylinder inoperative and it is for this purpose that I provide the empty and load change-over valve 8. To cut out the load brake cylinder 5, so that the empty brake cylinder 4 only is operative to operate the brakes, the valve 8 is manually rotated, through the medium of any suitable handle or the like, (not shown), from the position in which it is shown in Fig. 1 to the position shown in Fig. 2, in which latter position the passages 45 and 47 of the valve are out of registration with the passages 61 and 43, and passages 46 and 48 respectively, so that the flow of fluid to and from the control valve device and load brake cylinder 5 is closed off, and communication is established from the passage 48 to the passage 55 by a cavity 59 in the valve, thus connecting the load brake cylinder and diaphragm chamber 28 in the valve device 7 to atmosphere.

Now when the triple valve device is operated to application position, fluid under pressure is supplied from the auxiliary reservoir 3 to the empty brake cylinder 4 by way of the triple valve slide valve chamber 13, port 60 in the main slide valve 14, passage 61, quick inshot valve chamber 62, past the unseated quick inshot valve 26 and through passage and pipe 43.

Fluid under pressure supplied to the passage 43 also flows to the inner seated area of the valve piston 18, and when the pressure of fluid acting on the inner seated area is sufficient to overcome the pressure of the spring 23, the valve piston will move downwardly from its seat ring 19 to its lowermost position, in which the valve 20 seats against the gasket 21.

When the valve piston 18 is thus moved, the quick inshot valve 26 seats, closing off the unrestricted flow of fluid under pressure to the empty brake cylinder. The empty brake cylinder pressure is then built up by fluid under pressure flowing through passage 61, a restricted passage 65 in the change-over valve 8 and passage and pipe 43, the passage 65 being preferably restricted to such an extent that it will require substantially the same time period to effect an application of the brakes with the empty brake cylinder alone as it requires to effect an application with both brake cylinders.

In the drawings all of the parts and devices have been shown mounted in the casing of the triple valve but it will be understood that the devices may be otherwise mounted so long as they function as intended.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with an empty brake cylinder and a load brake cylinder, of means operative to supply fluid under pressure to said empty brake cylinder, and a means subject to a predetermined pressure in said empty brake cylinder for supplying fluid under pressure to said load brake cylinder and operative to control the supply of fluid under pressure to the load brake cylinder to prevent said predetermined pressure from reducing into the load brake cylinder.

2. In a fluid pressure brake, the combination with an empty brake cylinder and a load brake cylinder, of means operative to supply fluid under pressure to said empty brake cylinder, and means normally closing off the supply of fluid under pressure to said load brake cylinder and operative to supply fluid under pressure to said load brake cylinder when the pressure in said empty brake cylinder is built up to a predetermined degree and to control the flow of fluid under pressure to the load brake cylinder to prevent the pressure of fluid in the empty brake cylinder from reducing into the load brake cylinder.

3. In a fluid pressure brake, the combination with an empty brake cylinder and a load brake cylinder, of means operative to supply fluid under pressure to said empty brake cylinder, and means operative to supply fluid under pressure to said load brake cylinder only after the pressure of fluid in said empty brake cylinder has been built up to a predetermined degree and operative to govern the supply of fluid under pressure to the load brake cylinder to prevent the pressure of fluid in the empty brake cylinder from reducing into the load brake cylinder.

4. In a fluid pressure brake, the combination with an empty brake cylinder and a load brake cylinder, of means operative to supply fluid under pressure to said empty brake cylinder, and means operative to supply fluid under pressure to said load brake cylinder and operative to prevent the pressure of fluid in said empty brake cylinder from reducing below a predetermined degree when said load cylinder is being supplied with fluid under pressure.

5. In a fluid pressure brake, the combination with an empty brake cylinder and a load brake cylinder, of means operative to supply fluid under pressure to said brake cylinders, and a valve device normally closing off the supply of fluid under pressure to said load brake cylinder and subject to a predetermined empty brake cylinder pressure for supplying fluid to said load brake cylinder and operative to govern the rate of the flow of fluid under pressure to the load brake cylinder to prevent the empty brake cylinder pressure from reducing into the load brake cylinder.

6. In a fluid pressure brake, the combination with an empty brake cylinder and a load brake cylinder, of means operative to supply fluid under pressure to said empty brake cylinder, and a valve device operative to supply fluid under pressure to said load brake cylinder and to prevent the pressure of fluid in the empty brake cylinder from reducing into the load brake cylinder, said valve device comprising a valve for controlling the flow of fluid to the load brake cylinder and a movable abutment for operating said valve subject to a predetermined empty brake cylinder pressure and the pressure of a spring for controlling the operation of said valve.

7. In a fluid pressure brake, the combination with an empty brake cylinder and a load brake cylinder, of means operative to supply fluid under pressure to said empty brake cylinder, a valve normally closing off the supply of fluid under pressure to said load brake cylinder and operative to supply fluid under pressure to the load brake cylinder, and a movable abutment subject to a predetermined empty brake cylinder pressure and the pressure of a spring for controlling the operation of said valve to control the supply of fluid under pressure to the load brake cylinder for preventing the pressure of fluid in the empty brake cylinder from reducing into the load brake cylinder.

8. In a fluid pressure brake, the combination with an empty brake cylinder and a load brake cylinder, of means operative to supply fluid under pressure to said empty brake cylinder, a valve operative to supply and close off the supply of fluid under pressure to said load brake cylinder, and an abutment subject to the opposing pressures of the empty brake cylinder and a spring for controlling the operation of said valve to prevent the pressure of fluid in the empty brake cylinder from reducing into the load brake cylinder.

9. In a fluid pressure brake, the combination with an empty brake cylinder and a load brake cylinder, of means operative to supply fluid under pressure to said empty brake cylinder, and means operative to supply fluid under pressure to said load brake cylinder and operative to prevent the pressure of fluid in said empty brake cylinder from reducing into said load brake cylinder when the load brake cylinder is being supplied with fluid under pressure.

10. In a fluid pressure brake, the combination with an empty brake cylinder and a load brake cylinder, of a triple valve device operative to supply fluid under pressure to the empty brake cylinder, a valve normally unseated to permit an unrestricted flow of fluid under pressure from said triple valve device and operative upon a predetermined build up of pressure in the empty brake cylinder for closing off the unrestricted flow of fluid to the empty brake cylinder, and means operative upon a predetermined build up in the pressure of fluid in the empty brake cylinder for supplying fluid under pressure to the load brake cylinder and operative to prevent the pressure of fluid in the empty brake cylinder from reducing into said load brake cylinder.

11. In a fluid pressure brake, the combination with an empty brake cylinder and a load brake cylinder, of a triple valve device operative to supply fluid under pressure to the empty brake cylinder, a valve normally unseated to permit an unrestricted flow of fluid under pressure from said triple valve device and operative upon a predetermined build up of pressure in the empty brake cylinder for closing off the unrestricted flow of fluid to the empty brake cylinder, and means operative upon a predetermined build up in the pressure of fluid in the empty brake cylinder for supplying fluid under pressure to the load brake cylinder and operative to prevent the unseating of said valve upon the supplying of fluid under pressure to the load brake cylinder.

12. In a fluid pressure brake, the combination with an empty brake cylinder, a load brake cylinder and a triple valve device operative to supply fluid under pressure to said empty brake cylinder and to establish communication through which fluid under pressure may flow to the load brake cylinder, and means interposed between said triple valve device and the load brake cylinder operative upon a predetermined build up in the empty brake cylinder pressure for supplying fluid under pressure to the load brake cylinder and operative to prevent the pressure of fluid in said empty brake cylinder from reducing into said load brake cylinder.

13. In a fluid pressure brake, the combination with an empty brake cylinder, a load brake cylinder and a triple valve device operative to supply fluid under pressure to said empty brake cylinder and to establish communication through which fluid under pressure may flow to the load brake cylinder, and pressure sensitive means interposed between said triple valve device and the load brake cylinder operative upon a predetermined build up in the empty brake cylinder pressure for supplying fluid under pressure to the load brake cylinder and operative to prevent the pressure of fluid in said empty brake cylinder from reducing into said load brake cylinder.

14. In a fluid pressure brake, the combination with an empty brake cylinder, a load brake cylinder and a triple valve device operative to supply fluid under pressure to said empty brake cylinder and to establish communication through which fluid under pressure may flow to the load brake cylinder, and means associated with said triple valve device and the load brake cylinder operative upon a predetermined build up in the empty brake cylinder pressure for supplying fluid under pressure to the load brake cylinder and operative to prevent the pressure of fluid in said empty brake cylinder from reducing into said load brake cylinder.

15. In a fluid pressure brake, the combination with an empty brake cylinder, a load brake cylinder and a triple valve device operative to supply fluid under pressure to said empty brake cylinder, of a valve normally unseated for permitting an unrestricted flow of fluid under pressure to said brake cylinder, means operative upon a predetermined build up in the empty brake cylinder pressure for causing said valve to seat to close off the unrestricted flow of fluid to said empty brake cylinder and for establishing communication through which fluid under pressure may flow to the load brake cylinder, and means operative upon a predetermined build up in the empty brake cylinder pressure for supplying fluid under pressure to the load brake cylinder and operative to prevent the reduction of the pressure of fluid acting on the first mentioned means upon the supplying of fluid under pressure to the load brake cylinder.

16. In a fluid pressure brake, the combination with an empty brake cylinder, a load brake cylinder and a triple valve device operative to supply fluid under pressure to said empty brake cylinder, of a valve normally unseated for permitting an unrestricted flow of fluid under pressure to said brake cylinder, a valve piston subject to a predetermined empty brake cylinder pressure for permitting said valve to seat and close off the unrestricted flow of fluid to said empty brake cylinder and for establishing communication through which fluid under pressure may flow to the load brake cylinder, and means operative upon a predetermined build up in the empty brake cylinder pressure for supplying fluid under pressure to the load brake cylinder and operative to prevent the pressure of fluid acting on said valve piston from being reduced sufficiently to permit said valve piston to operate to unseat said valve upon the supplying of fluid under pressure to the load brake cylinder.

17. In a fluid pressure brake, the combination with an empty brake cylinder, a load brake cylinder and a triple valve device operative to supply fluid under pressure to said empty brake cylinder, of a valve normally unseated for permitting an unrestricted flow of fluid under pressure to said brake cylinder, a valve piston subject to a predetermined empty brake cylinder pressure for permitting said valve to seat and close off the unrestricted flow of fluid to said empty brake cylinder and for establishing communication through which fluid under pressure may flow to the load brake cylinder, and means interposed between said valve piston and the load brake cylinder operative upon a predetermined build up in empty brake cylinder pressure for supplying fluid under pressure to the load brake cylinder and operative to prevent the reduction of the pressure of fluid acting on said valve piston upon the supplying of fluid under pressure to the load brake cylinder.

In testimony whereof I have hereunto set my hand, this 26 day of February, 1929.

CLYDE C. FARMER.